US005295240A

United States Patent [19]

Kajimoto

[11] Patent Number: 5,295,240

[45] Date of Patent: Mar. 15, 1994

[54] APPARATUS AND METHOD FOR GENERATING CHARACTER PATTERN DATA

[75] Inventor: Kazuhiro Kajimoto, Suwa, Japan

[73] Assignee: Seiko Epson Corporation, Tokyo, Japan

[21] Appl. No.: 80,147

[22] Filed: Jun. 23, 1993

Related U.S. Application Data

[63] Continuation of Ser. No. 491,387, Mar. 9, 1990, abandoned.

[30] Foreign Application Priority Data

Mar. 10, 1989 [JP] Japan .................................. 1-58120

[51] Int. Cl.[5] .............................................. G06F 15/62

[52] U.S. Cl. .................................... 395/151; 345/127; 345/144

[58] Field of Search ................ 395/150, 151; 340/730, 340/731, 735, 750

[56] References Cited

U.S. PATENT DOCUMENTS

| | | | |
|---|---|---|---|
| 4,254,468 | 3/1981 | Craig | 395/150 |
| 4,298,945 | 11/1981 | Kyte et al. | 395/150 |
| 4,675,830 | 6/1987 | Hawkins | 395/151 |
| 4,907,282 | 3/1990 | Daly et al. | 395/150 |
| 4,949,281 | 8/1990 | Hillenbrand et al. | 395/150 |
| 5,050,103 | 9/1991 | Schiller et al. | 364/521 |
| 5,099,435 | 3/1992 | Collins et al. | 395/150 |

*Primary Examiner*—Gary V. Harkcom
*Assistant Examiner*—Joseph H. Feild
*Attorney, Agent, or Firm*—Blum Kaplan

[57] ABSTRACT

A character pattern generating apparatus providing a character pattern which can be reduced or enlarged in size providing high fidelity. The apparatus stores outline data of the dot patterns to be displayed. The outline data includes line segments and/or subcurves and associated correction data. In computing the display coordinates for the selected outline data, the line segments and/or subcurves forming the outline are multiplied by a scaling factor modified by the correction data.

18 Claims, 4 Drawing Sheets

FIG. 3
| LINE SEGMENTS | INITIAL POINT COORDINATES (1a) | TERMINAL POINT COORDINATES (1b) | CORRECTION DATA (1c) | |
|---|---|---|---|---|
| | | | 40/256 | (1e) |
| A | 10,41 | 230,4 | 0 | (1d) |
| B | 26,19 | 214,19 | 0 | |
| C | 26,82 | 214,82 | 0 | |
| D | 26,97 | 214,97 | 0 | |
| E | 26,160 | 214,160 | 0 | |
| F | 26,175 | 214,175 | 0 | |
| G | 26,238 | 214,238 | 0 | |
| H | 10,253 | 230,253 | +1 | |
| | | | | |
FIG. 5(a)
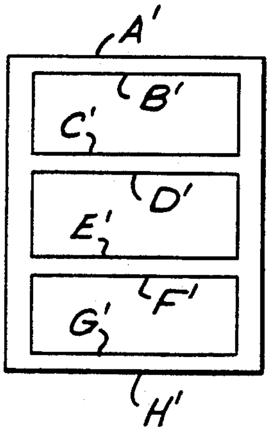
FIG. 5(b)
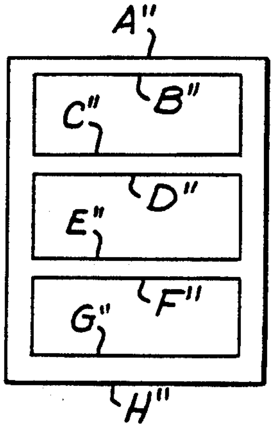

APPARATUS AND METHOD FOR GENERATING CHARACTER PATTERN DATA

This is a continuation of U.S. patent application Ser. No. 07/491,387, filed on Mar. 9, 1990, for APPARATUS AND METHOD FOR GENERATING CHARACTER PATTERN DATA, now abandoned.

BACKGROUND OF THE INVENTION

This invention relates generally to a dot pattern data generating apparatus, and more particularly to generating different sizes of a dot pattern for use in printers, display devices and the like.

Character pattern data generators for generating dot patterns typically employ outline data for each character to be generated. The outline data, which represents only the outline of the character pattern, is broken down into a plurality of line segments. A particular line segment of the outline data can be used for generating the outline of a character, numeral, symbol, graph or the like.

The overall quality of each character is enhanced by increasing the number of dots used to form the character. Word processors or the like typically produce significantly enhanced character patterns by sharply increasing the number of dots used to form the character patterns. The sharp increase in the number of dots used to form the character patterns requires a significant increase in the storage capacity of the character generator to store the dot pattern data.

To obviate such storage requirements, only outline data of the character pattern to be formed, rather than the entire dot pattern of the character to be generated is stored in the character generator. Once the particular outline data for a particular character pattern is chosen, the character generator will convert the outline data into a dot pattern of data for printing or displaying the latter. The outline data also can be modified to enlarge or reduce the size of the character pattern. Reduction in the size of the character pattern when formed from the outline data, however, often results in the spacing (i.e., spatial width) between characters being reduced by a multiplying factor different than the multiplying factor applied to the characters. A decrease in the overall quality of the reduced character pattern results.

More particularly, an outline font provides an outline of the character pattern on a map scale (e.g., 1 bit mapping), by splitting the outline data into a plurality of line segments and/or subcurves which can be stored in the generating apparatus. During display or printing, the region enclosed by the outline data is filled with dots to create a dot pattern of character data. When the dot pattern of character data is reduced, the ratio between the width of the character and spacing between characters changes because of the need for integer processing to convert the characters onto a map scale as explained below. A poor facsimile of the character pattern results.

The distortion created by reducing the character pattern can be more readily appreciated by analyzing, for exemplary purposes only, a Chinese character [Me] (eye). In this example, the original outline of the character pattern prior to reduction is represented on a bit map of, for example, 256×256 dots. A plurality of line segments and subcurves represent the outline of the character pattern. Each line segment and subcurve is defined by an initial and terminal coordinate. As used herein, the original outline is also referred to as a standard size pattern of outline data. The coordinates for the initial and terminal points of the line segments and/or subcurves representing the outline data of the standard size pattern are stored within the character generator. As shown in FIG. 6(*a*), an outline S having a center line T is defined by line segments having coordinates corresponding to the size of the dots which will form the dot pattern. FIG. 6(*b*) illustrates an outline S′ reduced from outline S. Outline S is shown in FIG. 6(*a*) within a bit map of 256×256 dots. Outline S′ is shown in FIG. 6(*b*) within a bit map of 40×40 dots (i.e., a scale down reduction ratio 40/256). Outline S′ includes a line T′ which corresponds to the center line T of outline S. In reducing outline S to outline S′, line T′ is no longer centered within outline S′ because the reduced initial and/or terminal point coordinates defining the line segments and subcurves forming outline S, normally include a decimal portion (fraction). These decimal portions are rounded to the nearest integer.

The reduced point coordinates need to be rounded because display of the character pattern by a liquid crystal panel or a wire dot, ink jet, thermal or laser printer must necessarily generate a dot of a given finite size corresponding to integer coordinates necessary to map the original coordinates of outline S into a. In other words, since the original coordinates include decimal portions which cannot be mapped directly into a binary map, the original coordinates must be subjected to integer processing (i.e., rounding processes such as half-adjust, round-down and round-up). The resulting character shape represented by the line segments and/or subcurves after integer processing no longer corresponding exactly to the original character shape. Reduction of the outline data further aggravates this non-correspondence resulting in line T′ no longer centered within outline S′i.e. no correspondence to the original shape. Integer processing does not significantly affect the quality of a character pattern which has been enlarged in size because an observer cannot notice if a line is wider by one dot in an enlarged character pattern.

FIGS. 5(*a*) and 5(*b*) further illustrate the distortion created in the outline data when subjected to reduction. The original character pattern is shown in FIG. 5(*a*) and includes linear (spatial) widths A′- B′, C′- D′, E′- F′, G′- H′. Each character pattern following reduction is shown in FIG. 5(*b*) and includes linear widths A″- B″, C″- D″, E″- F″ and G″- H″. The linear width G″- H″, however, is not equal to linear widths A″- B″, C″- D″ and E″- F″. A remarkably degraded reduced character pattern can result.

Accordingly, it is desirable to provide an apparatus and method for generating dot pattern data which can produce a reduced dot pattern of high fidelity simply and efficiently.

SUMMARY OF THE INVENTION

Generally speaking, in accordance with the invention, an apparatus for generating different sizes of at least one dot pattern wherein each dot pattern is generated based on a code signal representing a selected dot pattern and corresponding multiplying factor, includes outline data storage circuitry for storing the outline data and correction data. The outline data represents the outline of at least one dot pattern of a predetermined size. The correction data represents the modification to be made to the multiplying factor to be applied to at least a portion of the outlined data.

The apparatus also includes readout circuitry for selecting the outline data and correction data based on the code signal. Arithmetic circuitry is provided for computing the display coordinates for the selected outline data based on the multiplying factor as modified by the selected correction data. The selected outline data and selected correction data are read out by the readout circuitry from the outline data storage circuitry. The apparatus further includes dot pattern generating circuitry for producing the selected dot pattern by filling in with dots the region enclosed by the display coordinates.

The outline data includes at least line segments or subcurves, each line segment and subcurve being defined by an initial point coordinate and terminal point coordinate. The correction data includes a corrective value for each line segment and subcurve. The dot patterns can include, but are not limited to, characters, numerals, symbols and graphs.

The initial point and terminal point coordinates for each line segment and subcurve each include an x axis value and y axis value. In one preferred embodiment of the invention, the correction data is only applied when the character pattern is to be reduced. More particularly, the correction data is applied to the display coordinates when the multiplying factor is less than 1.0 to change at least one of the x axis values and y axis values by an amount equal to an integer valve of 1.0.

Accordingly, it is an object of the invention to provide an improved character pattern generating device which generates an enlarged, reduced or same size dot pattern of characters for use in printers, display devices or the like.

It is another object of the invention to provide an improved character pattern transforming system which reduces the original character pattern formed from a dot matrix based on a scaling factor applied to the original character pattern while maintaining the same proportional spacing between characters in the pattern.

It is a further object of the invention to provide an improved character pattern generator capable of generating dot patterns of high character quality regardless of the size of the dot pattern generated.

Still other objects and advantages of the invention will, in part, be obvious and will, in part, be apparent from the specification.

The invention accordingly comprises several steps and a relation of one or more such steps with respect to each of the others, and the system embodying features of construction, a combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a table of the coordinates of FIG. 2 and of correction data segregated by line segments;

FIGS. 5(*a*) and 5(*b*) are outlines of the character patterns after and prior to application of correction data, respectively;

FIG. 6(*b*) is a reduced character pattern of FIG. 6(*a*).

DETAILED DESCRIPTION OF THE PREFERRED EMBODIMENT

Figure 1:
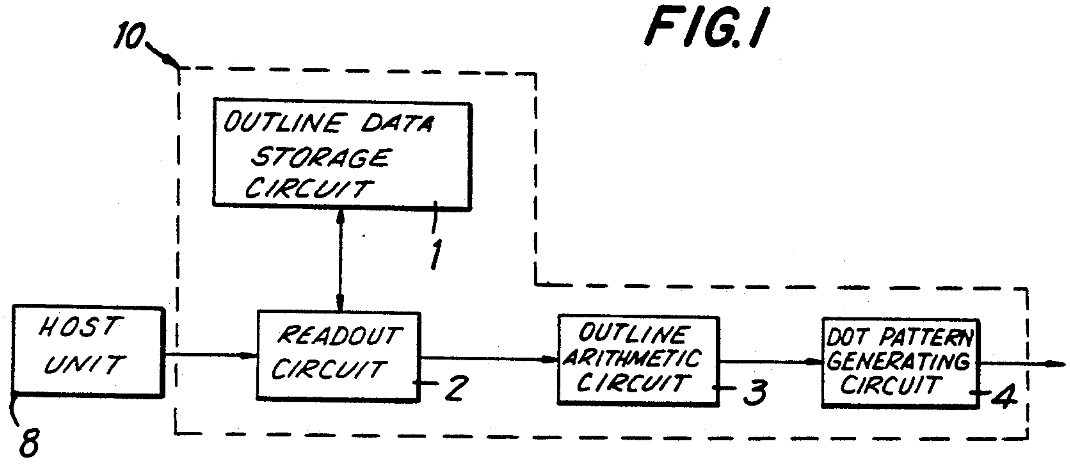
FIG. 1 is a block diagram of a character pattern generator in accordance with the invention.
Figure 2:
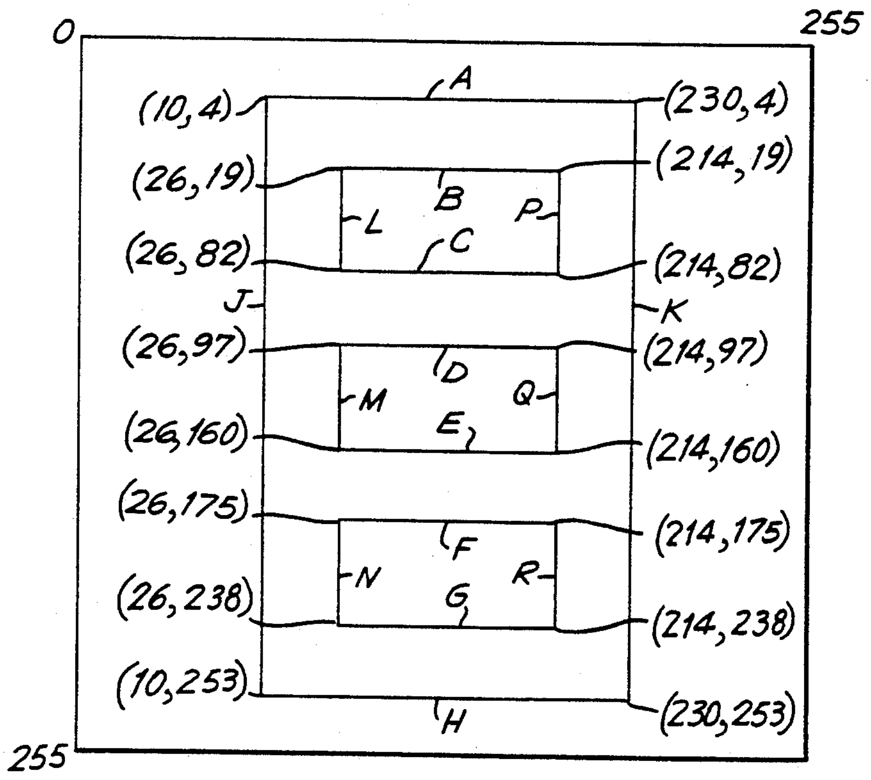
FIG. 2 illustrates an outline of a character pattern including coordinates thereof which are stored within an outline data storage circuit of FIG. 1.

As shown in FIG. 1, a character pattern generator includes an outline data storage circuit 1 which stores pairs of correction data 1(*c*) (as shown in FIG. 3) for correcting line segment position coordinates of outline data representing a character pattern such as shown in FIG. 2. The character pattern shown in FIG. 2 includes a plurality of line segments A - H, J - N and P - R within a matrix of 255×255 dots. Each of the line segments is represented by an initial point coordinate 1*a* and a terminal point coordinate 1*b* as shown in FIG. 3. Correction data 1*c* represents the correction required for a reduction from a character pattern of standard size, as shown in FIG. 2, to a character pattern formed within a matrix of 40×40 dots. In particular, column 1*d* of correction data 1*c* represents the amount of correction required to each line segment representing the outline data of the character pattern to compensate for the disproportionate reduction in the spatial width between adjacent line segments. Column 1*e* of correction data 1*c* can represent the amount of correction for each line segment when enlarging the outline or under other conditions as required.

Device 10 also includes a readout circuit 2 for reading out the outline data of the character code signal provided from a host unit 8 and the outline data, including the initial point coordinates 1*a*, terminal point coordinate 1*b* and correction data 1*c*, provided by outline data storage circuit 1. An outline arithmetic circuit 3 computes the coordinates of the outline data of the character pattern to be displayed based on the character size data provided by the character code signal as modified by the correction data and the character pattern data provided by outline data storage circuit 1. The outline data of the character pattern produced by outline arithmetic circuit 3 will be either enlarged, reduced or the same size as the original outline data provided by circuit 1. When the size of the outline data of the character pattern is to be modified (i.e., reduced or enlarged) the X axis and Y axis coordinates of the line segments are modified based on a scaling factor and further based on correction data 1*c*.

Generator 10 also includes a dot pattern generating circuit 4 which receives the output from outline arithmetic circuit 3 and produces dot pattern data by generating a plurality of dots within the region defined by the enclosed outline of data.

Figure 4:
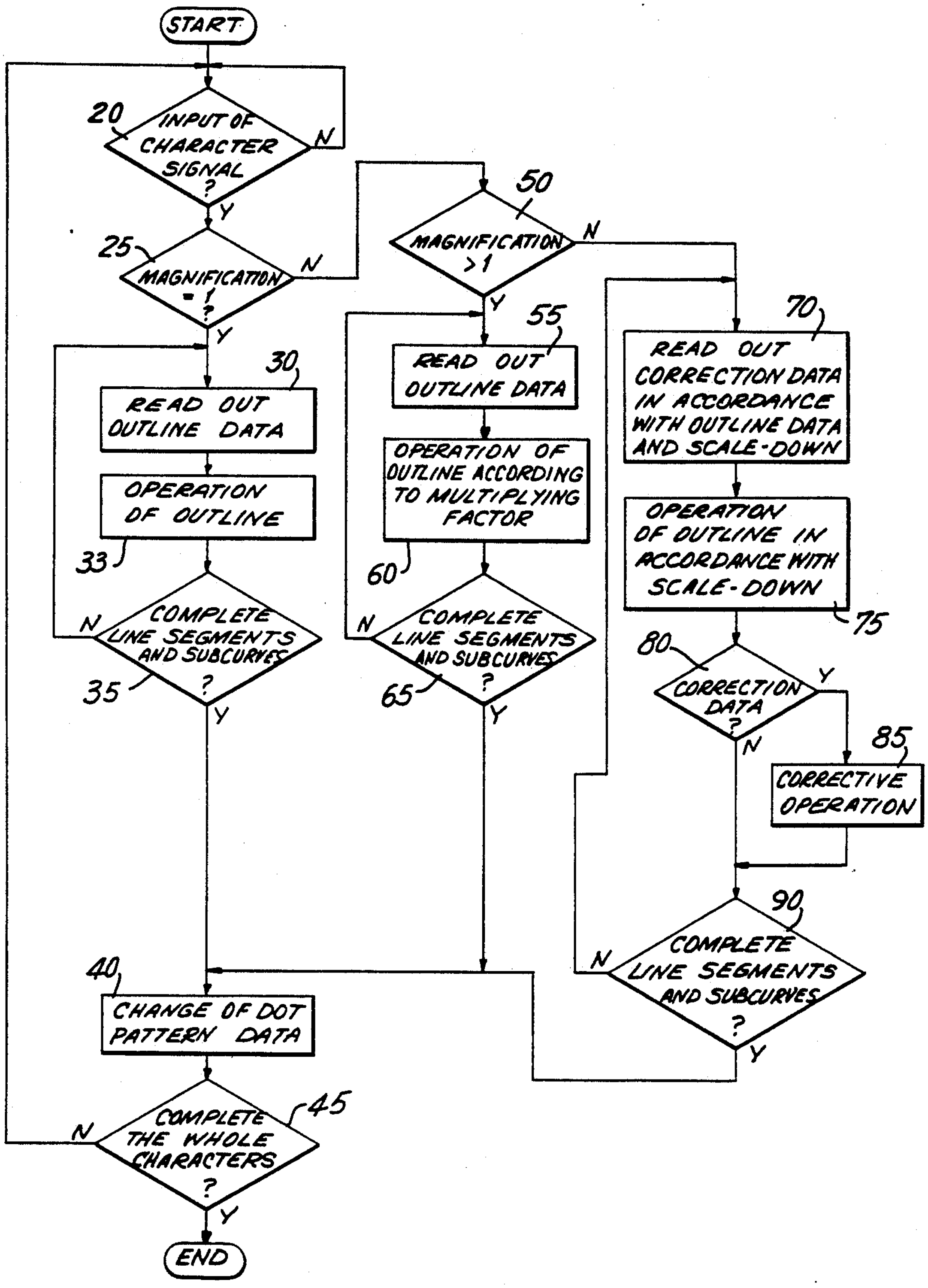
FIG. 4 is a flow chart of the character pattern generator in accordance with the invention.
Figure 6B:
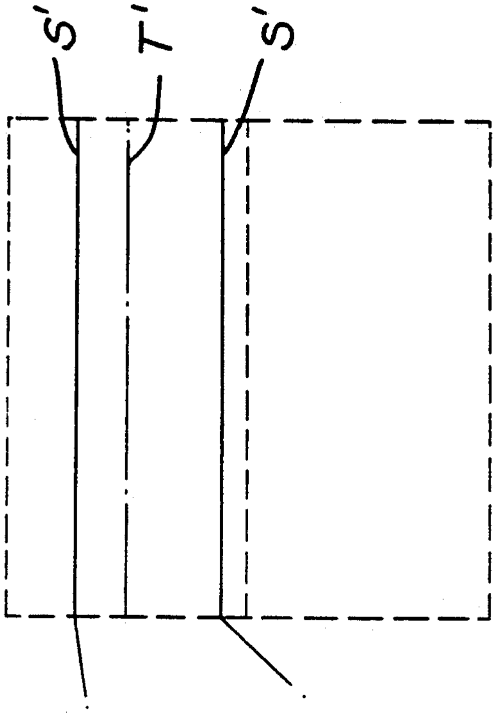
FIG. 6(*a*) is a standard size character pattern.
Figure 6A:
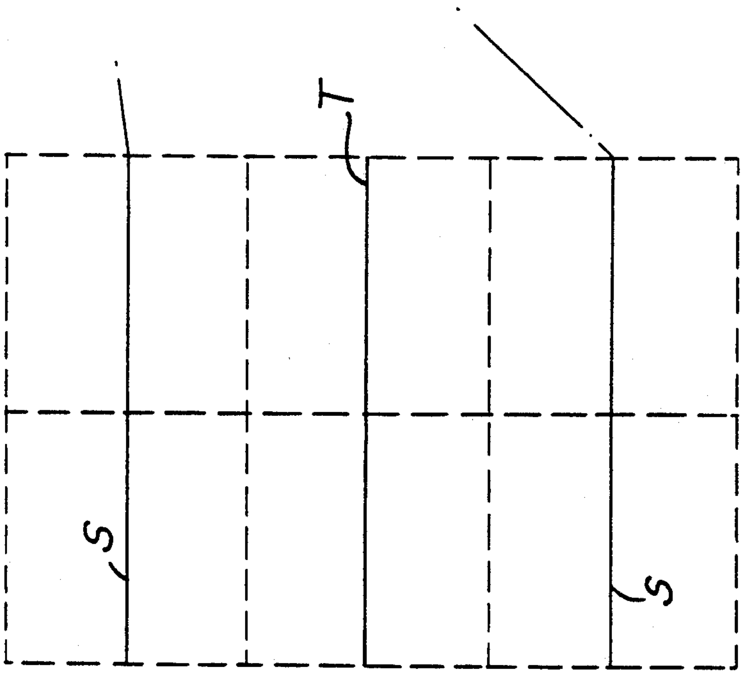

Operation of character pattern generator 10 is illustrated in FIG. 4. Under step 20, readout circuit 2 determines when a character code signal, representing both a particular type and size of character pattern, has been supplied from host unit 8. In the event that no character code signal is received from host unit 8, readout circuit 2 will continue to monitor host unit 8 until determining that a character code signal has been received from host unit 8.

STANDARD MODE

As used herein, the standard mode represents the condition when there is no enlargement or reduction in the size of the character pattern, that is, the character pattern is magnified by a factor of 1. Under step 25 readout circuit 2 determines that the magnification of the character pattern is equal to a multiplication factor of 1. Under step 30, readout circuit 2 selects and reads out an outline of the character pattern represented by the character code signal based on a magnification factor of 1 (i.e., correction data 1*c* equal to 0 for line segments). In particular, the line segments and/or subcurves represented by the initial point coordinates 1*a* and terminal point coordinates 1*b*, represented by the character code signal are read out under step 33. Outline arithmetic circuit 3 computes the display coordinates of the outline read out by readout circuit 2. Each line segment based on its initial point coordinate 1*a* and terminal point coordinate lb is computed. The arithmetic result is outputted to dot pattern generating circuit 4 under step 35. No correction required of the arithmetic result is required since the outline of the character pattern is neither being enlarged nor reduced.

Under step 40, dot pattern generating circuit 4 fills the interior of the region enclosed by the outline of the character pattern with dots and outputs the same as dot pattern data of the character corresponding to the character code selected. Under step 45 readout circuit 2 or any other suitable circuitry determines whether any additional character patterns are to be generated and, if so, awaits such input under step 20.

ENLARGEMENT MODE

Under step 25, if magnification of the character pattern represented in the character code signal provided by host unit 8 is not equal to a factor of 1, under step 50 readout circuit 2 determines whether the character pattern is to be enlarged (i.e., magnified by a multiplying factor greater than 1). If the outline of the character pattern is to be enlarged, under step 55 readout circuit 2 will read out the line segments and/or subcurves represented by the initial point coordinates 1*a* and terminal point coordinates 1*b* and the correction data 1*c*, corresponding to the desired enlarged character pattern, represented by the character code signal from outline data storage circuit 1. Outline arithmetic circuit 3 will compute the display coordinates of the outline by modifying the outline data representing the desired character pattern based on the initial point coordinate 1*a* and terminal point coordinate 1*b* for each of the line segments included within the outline data based on the magnification (multiplying factor) which is greater than 1 under step 60. Since correction for enlargement is not normally required no correction data 1*c* need be applied in computing the display coordinate. Dot pattern generating circuit 4 determines, under step 65, when all line segments and/or subcurves form a complete outline of a character pattern. Under step 40 the outline data from outline arithmetic circuit 3 is converted into dot pattern data by filling in the dots within the enclosed outline. Once all characters have been generated the dot pattern data is outputted to the display unit (e.g., printer, liquid crystal panel or the like) under step 45.

Scale-Down Mode

In the event that the magnification of the character pattern under step 50 is not greater than 1, under step 70 readout circuit 2 will readout initial point coordinates 1*a* and terminal point coordinates 1*b* and correction data 1*c* corresponding to the line segments and/or subcurves defining the outline of the desired reduced character pattern represented by the character code signal from outline data storage circuit 1.

The outline arithmetic circuit 3 computes new initial and terminal point coordinates of a scale-down outline of the selected character pattern based on the reduction in the multiplying (scale-down) factor applied to the selected outline of the character signal as shown in Table I below. The calculation of these new initial and terminal point coordinates of a scale-down character pattern are performed under integer nonprocessing under step 75. Step 75 also includes integer processing as shown in Table II below in which the scale-down character with the new initial and terminal point coordinates are converted into integers to permit bit mapping of the outline (calculated display coordinates). As shown in Table II, the linear (spatial) width between the reduced line segments G"- H" is separated by three dots whereas reduced line segments A"- B", C"- D" and E"- F" are separated by linear widths of only two dots. Under step 80, outline arithmetic circuit 3 determines whether the linear widths between these reduced line segments needs to be corrected based on correction data 1*c*. In particular, correction data 1*c* will be applied to the linear width between line segments G"- H" to eliminate this distortion in the reduced character pattern so that the linear width between line segments G"- H" is also equal to two dots.

| | TABLE I Integer non-processing | | TABLE II Integer processing | | |
|---|---|---|---|---|---|
| Line segment | Initial point coordinates | Terminal point coordinates | Initial point coordinates | Terminal point coordinates | Linear width |
| A" | 1.5, 0.6 | 35.9, 0.6 | 2, 1 | 36, 1 | 2 |
| B" | 4.0, 2.9 | 33.4, 2.9 | 4, 3 | 33, 3 | 10 |
| C" | 4.0, 12.8 | 33.4, 12.8 | 4, 13 | 33, 13 | 2 |
| D" | 4.0, 15.1 | 33.4, 15.1 | 4, 15 | 33, 15 | 10 |
| E" | 4.0, 25.0 | 33.4, 25.0 | 4, 25 | 33, 25 | 2 |
| F" | 4.0, 27.3 | 33.4, 27.3 | 4, 27 | 33, 27 | 10 |
| G" | 4.0, 37.1 | 33.4, 37.1 | 4, 37 | 33, 37 | 3 |
| H" | 1.5, 39.5 | 35.9, 39.5 | 2, 40 | 36, 40 | |

The distortion in the outline of the character pattern prior to application of correction data 1*c* is shown in FIG. 5(*b*). FIG. 5(*a*) illustrates the outline of the character pattern once correction data 1*c* is applied under step 85. Under step 80 no correction data will be applied to the linear widths separating line segments A"- B", C"- D" and E"- F". Under step 90, if all line segments and/or subcurves have not been calculated by outline arithmetic circuit 3, each of the remaining line segments and/or subcurves are read out by readout circuit 2 under step 70 and reduced in size by outline arithmetic circuit 3 under step 75. Once all line segments and/or subcurves forming a complete outline of the desired character pattern have been processed by outline arithmetic circuit 3, the complete reduced outline of the character pattern is provided to dot pattern generating circuit 4 under step 40 which fills in the dots within the region enclosed by the outline of the character pattern to form dot pattern data to be displayed. If not all characters which are to be reduced have been modified, under step 45 the foregoing method is repeated.

Referring once again to step 75, integer processing for each line segment based on its initial and terminal coordinates is performed by outline arithmetic circuit 3. Under step 80, outline arithmetic circuit 3 determines whether correction data must also be applied to each particular line segment. Application of correction data 1c to line segment H" results in line segment H" being raised by one dot in its Y-coordinate values (corrected calculated display coordinates) to form line segment H'. In other words, the initial point coordinates and terminal point coordinates of line segment H" following application of correction data 1c changes from (2, 40) and (36, 40) to (2, 39) and (36, 39), respectively. Accordingly, the spacing (i.e., linear width) between line segments G'- H' are two dots following corrective operation under step 85. Spacing between line segments A'-B', C'- D', E'- F', G'- H' following the corrective operation under step 85 are all equal (i.e., two dots). A scale-down outline pattern proportional to the original outline pattern is achieved.

Scale-down characters generated by laser printer or the like will produce character patterns proportionally identical to the original character pattern in accordance with the invention. Well balanced logos and characters for all sizes can be printed or displayed in accordance with the invention.

The foregoing embodiment has addressed maintaining, enlarging or reducing the size of a character pattern in one dimension (i.e., Y-coordinate axis). Correction of a character pattern is not limited to this particular dimension. For example, correction within the same character may be required if different scaling factors are used to generate the character and can require correction in other dimensions defining the particular character. Under such circumstances, correction data for each dimension can be created and stored in outline data storage circuit 1. For example, the foregoing embodiment of the invention has been described in particular in connection with correction of lateral lines in the Y-axis direction. Storage of data for correcting longitudinal lines in the X-axis direction is also fully in accordance with the invention. Bidirectional correction of a character pattern can be stored within outline data storage circuit 1 in accordance with the invention.

Similar to the scale-down mode, in the enlargement mode a linear width of an enlarged outline of a character pattern can be performed by applying correction data based on the selected enlargement factor to round upwardly (the immediate high-order side) or round downwardly (the low-order side) as required. An enlarged character pattern of enhanced quality results.

The invention is not limited to generation of Chinese characters and may be used for alpha-numeric characters, Korean characters, symbols and the like. Graphs including shapes such as circles, triangles, rectangles and other geometric shapes, patterns and marks may also be generated in accordance with the invention. Apparatus 10 can be incorporated into or attached to a display unit. Readout circuit 2 would then be operated in accordance with a (outline) display command. The outline display can be effected on a display unit such as CRT and/or a liquid crystal panel. The invention can be used in printers for use with large size computers, personal computers, work stations and electronic calculators.

As now can be readily appreciated, apparatus 10 can be used to generate a reduced or enlarged dot pattern having high fidelity of the original pattern by correcting the inter-line distance between line segments forming the outline of the character pattern. Such fidelity is achieved even though the original pattern is bit mapped regardless of the mapping technique employed.

The invention provides a character pattern generator for enlarging, reducing or maintaining the same size character pattern by initially selecting outline data and corresponding correction data associated with a particular character pattern of a desired size, employing integer processing to prepare the initial and terminal point coordinates of each line segment or subcurve of the outline data for bit mapping and thereafter applying required correction data to compensate for distortion in the outline data due to enlargement or reduction in the size of the original character pattern. Advantageously the invention can be used in printers and liquid crystal panels and the like.

It will thus be seen that the objects set forth above, and those made apparent in the preceding description are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all generic and specific features of the invention herein described and all statements of the scope of the invention, which, as a matter of language might be said to fall therebetween.

What is claimed is:

1. An apparatus for generating different sizes of a dot pattern having an outline being generated based on a code signal representing a selected dot pattern and corresponding multiplying factor, comprising:

outline data storage means for storing outline data representing the outline of at least one dot pattern and correction data, the outline having a predetermined size and including at least line segments or subcurves;

readout means for receiving the code signal and selecting from the outline data storage means outline data and correction data in response to the code signal;

arithmetic means for computing display coordinates for the selected dot pattern and multiplying factor, wherein the multiplying factor is used in the computations to determine calculated display coordinates from selected outline data, the arithmetic means modifying the calculated display coordinates in accordance with a value represented by the selected correction data to correct errors within the outline in spacing between line segments or subcurves when the multiplying factor is less than one, the arithmetic means producing display coordinates for the selected size of the selected dot pattern in integer form when the magnification factor is less than one, said selected outline data and selected correction data being read out by the readout means from the outline data storage means; and dot pattern generating means for producing the selected dot pattern represented by the code signal and defining a region enclosed therein and by filling in with dots the region enclosed by the corrected calculated display coordinates.

2. The apparatus of claim 1, wherein each line segment and subcurve is defined by at least an initial point coordinate and terminal point coordinate.

3. The apparatus of claim 2, wherein the correction data includes a corrective value for each line segment and subcurve.

4. The apparatus of claim 3, wherein each dot pattern is selected from a group consisting of characters, numerals, symbols and graphs.

5. The apparatus of claim 1, wherein each dot pattern is selected from a group consisting of characters, numerals, symbols and graphs.

6. The apparatus of claim 2, wherein each dot pattern is selected from a group consisting of characters, numerals, symbols and graphs.

7. The apparatus of claim 2, wherein the initial point coordinate and terminal point coordinate, for at least one of the line segments or subcurves stored in the outline data storage means, include an integer.

8. The apparatus of claim 7, wherein the arithmetic means computes the display coordinates as integer values in binary form.

9. The apparatus of claim 8, wherein the initial point and terminal point coordinates each include an x axis value and y axis value and wherein the arithmetic means applies the correction data to the display coordinates when the multiplying factor is less than 1.0 to change at least one of the x axis values and y axis value of the initial and terminal coordinates by an amount equal to an integer value of 1.0

10. The apparatus of claim 3, wherein the initial point coordinate and terminal point coordinate, for at least one of the line segments or subcurves stored in the outline data storage means, include an integer.

11. The apparatus of claim 10, wherein the arithmetic means computes the display coordinates as integer values in binary form.

12. The apparatus of claim 11, wherein the initial point and terminal point coordinates each include an x axis value and y axis value and wherein the arithmetic means applies the correction data to the display coordinates when the multiplying factor is less than 1.0 to change at least one of the x axis values and y axis values of the initial and terminal coordinates by an amount equal to an integer value of 1.0.

13. An apparatus for generating different sizes of a dot pattern having an outline being generated based on a code signal representing a selected dot pattern and corresponding multiplying factor, comprising:

outline data storage means for storing outline data representing the outline of at least one dot pattern and correction data, the outline having a predetermined size and including at least line segments or subcurves, each line segment and subcurve being defined by an initial point coordinate and terminal point coordinate, the initial point and terminal point coordinates each including an x axis value and y axis value, wherein the multiplying factor is applied to at least a portion of the outline data being modified in accordance with a value represented by the correction data;

readout means for receiving the code signal and selecting from the outline data storage means outline data and correction data in response to the code signal;

arithmetic means for computing display coordinates for the selected dot pattern and multiplying factor, wherein the multiplying factor is used in the computations to determine calculated display coordinates from selected outline data, the arithmetic means modifying the calculated display coordinates in accordance with a value represented by the selected correction data to correct errors within the outline in spacing between line segments or subcurves when the multiplying factor is less than one, the arithmetic means producing the calculated display coordinates by integer processing after application of the multiplying factor and thereafter applying the correction data to at least a portion of the dot pattern when the multiplying factor is less than one, said selected outline data and selected correction data being read out by the readout means from the outline data storage means, the arithmetic means applying the correction data to the display coordinates when the multiplying factor is less than one to change at least one of the x axis values and y axis values of the initial and terminal coordinates by an integer; and dot pattern generating means for producing the selected dot pattern represented by the code signal and defining a region enclosed therein and by filling in with dots the region enclosed by the corrected calculated display coordinates.

14. The apparatus of claim 13, wherein said correction data is applied to change at least one of the x axis values and y axis values of the initial and terminal coordinates by an amount equal to an integer value of 1.0.

15. A method for generating different sizes of a dot pattern, each dot pattern having an outline and being generated based on a code signal representing a selected dot pattern and corresponding multiplying factor, comprising the steps of:

storing outline data representing the outline of at least one dot pattern, said outline having a predetermined size, and correction data, wherein the multiplying factor is applied to at least a portion of the outline data;

selecting from the data storage means outline data and correction data in response to the code signal;

computing display coordinates for the selected dot pattern and multiplying factor, wherein the multiplying factor is used in the computation to produce calculated display coordinates from the selected outline data and the calculated display coordinates are modified in accordance with a value represented by the correction data to correct errors in the modified outline data representing errors within the outline when the multiplying factor is less than one, said corrected calculated display coordinates being in the form of integers; and generating the selected dot pattern by filling in with dots a region enclosed by the corrected calculated display coordinates.

16. The apparatus of claim 15, wherein said dot pattern is a pattern of characters.

17. The apparatus of claim 15, further comprising the step of placing the calculated display coordinates in integer form and said correction data being an integer.

18. The apparatus of claim 17, wherein said correction data is an integer equal to one.

* * * * *